United States Patent
Pettersson

(10) Patent No.: US 6,772,174 B1
(45) Date of Patent: Aug. 3, 2004

(54) DATA ADMINISTRATION METHOD

(75) Inventor: Jerry Pettersson, Karlskoga (SE)

(73) Assignee: Cycore AB, Uppsala (SE)

( * ) Notice: Subject to any disclaimer, the term of this patent is extended or adjusted under 35 U.S.C. 154(b) by 0 days.

(21) Appl. No.: 09/831,942

(22) PCT Filed: Nov. 16, 1999

(86) PCT No.: PCT/IB99/01839

§ 371 (c)(1),
(2), (4) Date: Jul. 18, 2001

(87) PCT Pub. No.: WO00/30315

PCT Pub. Date: May 25, 2000

(30) Foreign Application Priority Data

Nov. 16, 1998 (DK) .......................................... 1998 01496

(51) Int. Cl.[7] .......................... G06F 17/30; B29C 45/00
(52) U.S. Cl. .................... 707/104.1; 707/100; 707/102; 701/200
(58) Field of Search .............................. 707/102, 104.1, 707/1, 100; 701/200

(56) References Cited

U.S. PATENT DOCUMENTS

| 5,638,523 A |   | 6/1997  | Mullet et al. |         |
|-------------|---|---------|---------------|---------|
| 5,963,956 A | * | 10/1999 | Smartt ................. | 707/104.1 |
| 6,308,132 B1 | * | 10/2001 | Wilson et al. ............. | 701/200 |
| 6,470,287 B1 | * | 10/2002 | Smartt ....................... | 702/102 |
| 2002/0069312 A1 | * | 6/2002 | Jones ......................... | 711/100 |
| 2003/0187819 A1 | * | 10/2003 | Gutierrez et al. ............. | 707/1 |

FOREIGN PATENT DOCUMENTS

| EP | 0785535    | 7/1997  |
| EP | 0802516    | 10/1997 |
| WO | WO 9707467 | 2/1997  |

* cited by examiner

Primary Examiner—Frantz Coby
(74) Attorney, Agent, or Firm—Birch, Stewart, Kolasch & Birch, LLP

(57) ABSTRACT

A method is disclosed for administrating large amounts are of data being associated with a spatial entity. The data are organised in layers of data having a mutual relation, primarily defining rules for interacting with other layers of data so as to generate derived layer of data of which one or more are output layers. The computer system represents the output layers to the user by means of a virtual representation of a spatial entity generated by a computer, and the data for generating the layers are administrated by a data communication network. Different sets of data are represented as different layers that interact and are presented to the user as being superimposed on the representation of the geographical entity, the different layers of data may interact so as e.g. to produce a new representation for the user or to initiate actions at systems or items being external to the computer operated by the user.

50 Claims, 1 Drawing Sheet

DATA ADMINISTRATION METHOD

Figure 1:
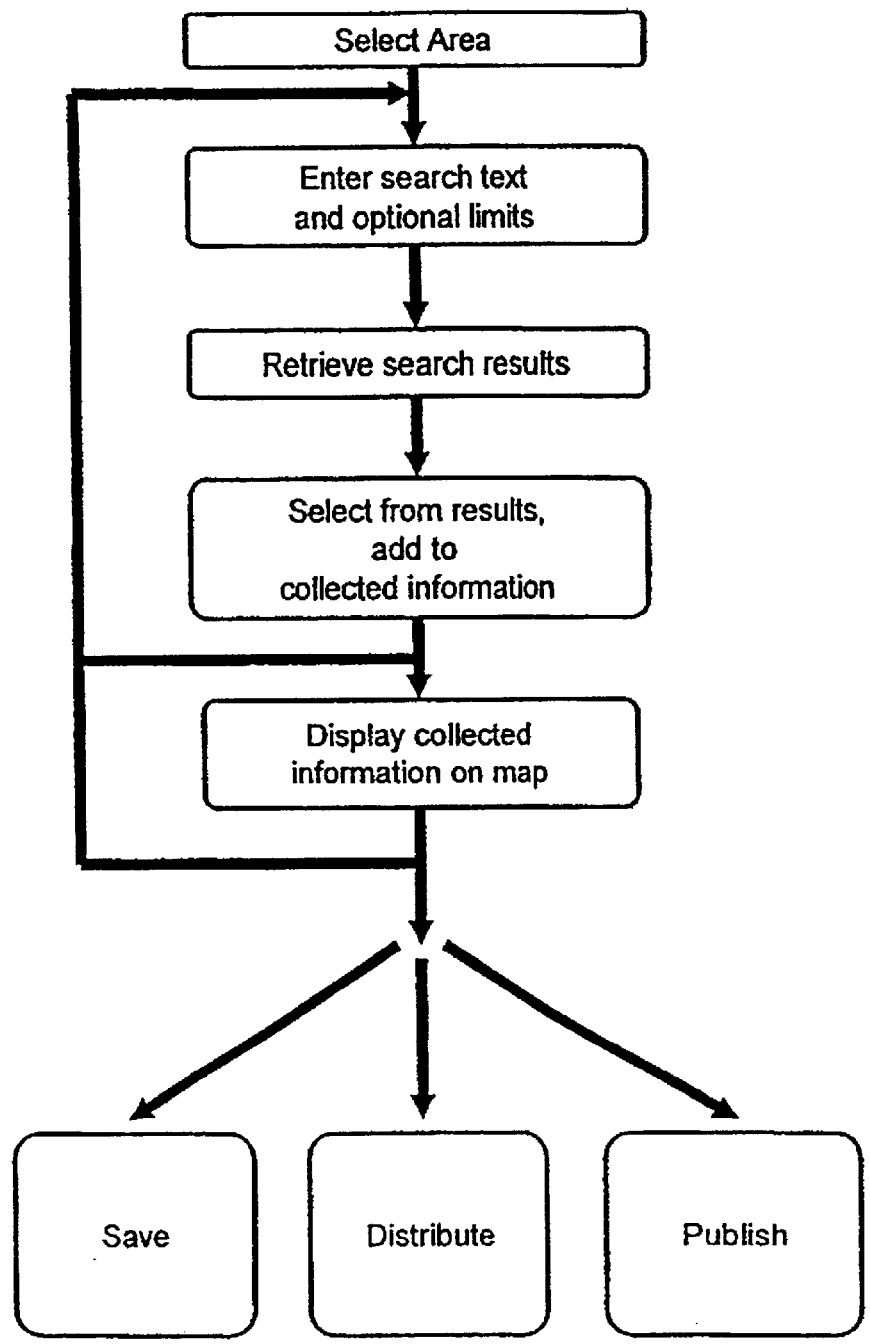

This application is national phase under 35 U.S.C. § 371 of PCT International Application No. PCT/IB99/01839 which has an International filing date of Nov. 16, 1999, which designated the United States of America and was published in English.

The present invention relates to a method for administrating and handling large amounts of data, such as e.g. statistical data, events or phenomena, the data being associated with a spatial entity, such as a geographical entity. The invention also relates to the computer system adapted for performing the method of the invention as well as the computer program product for adapting a general-purpose computer system to performing the method. The data are organised in layers of data having a mutual relation, primarily defining rules for interaction with other layers of data so as to generate derived layer of data of which one or more are output layers. The computer system represents the output layers to the user by means of a virtual representation of a spatial entity, such as a topological or geographical entity generated by the computer, and the data for generating the layers are administrated by a data communication network.

In particular, the invention relates to a method according to which at least a part of the representation of the spatial entity comprises a number of sub-layers arranged hierarchically so that a lower layer comprises a representation of the geographical entity in greater detail than a higher level, and the data or parts of the data may be associated with one or more of these sub-layers.

Alternatively or additionally, different sets of data may be represented as different layers that interact and are presented to the user as being superimposed on the representation of the geographical entity, the different layers of data may furthermore be enabled to interact so as e.g. to produce a new representation for the user or to initiate actions at systems or items being external to the computer operated by the user.

BACKGROUND OF THE INVENTION

It is known today to exchange data representing e.g. information or interaction with computer systems, over a communication network, such a an open network, and for a user operating a computer connected to the network to have access to the data by using a browser. However, with the present and rapidly increasing amount of data available on open, public network, it is very difficult for a user to find and select the relevant information from the data being available.

The organisation of data and the presentation of the organisation of data to the user is essential for enabling the individual user to have access to the amount of data from a practical and not only theoretical point of view. A spatial representation having a commonly known mapping would, for at least data having an association with said mapping, be a natural environment for the human mind to perceive passive and active information as contrast to the present structure or lack of structure of information.

It is known from WO 97/07467 to present a map of an area supplied from a map server to a user and superimpose on this map information relating to a place of interest. The information may contain details of hotels, restaurants, shops or the like, associated with the geographical co-ordinates of each location.

It is furthermore known from EP 0 802 516 A2 to present a three-dimensional map to the user on a two-dimensional screen for navigational use. The map may be presented to the user from the viewpoint of the user or from any selected viewpoint.

Another system for navigational use is known from EP 0 785 535 A1 which discloses a guidance system for vehicles. The system displays road maps to the user as well as other information upon request, such as traffic information an sightseeing information, and the display device is in wireless connection with information supply servers. The display device comprises a position detection section, using e.g. the Global Positioning System (GPS) and the detected position is used to select the area to show on the display.

The known systems are only able to administer a limited amount of information being selected by the user from a small, well defined library of information. The systems offers no possibility of performing an automated selection among a large amount of information to obtain a limited number of high relevance to the user. Thus, these known systems include no advantages over the known general purpose interface applications, browsers, for searching and retrieving information from a plurality of external servers via a public communication network.

Thus, it is an object of the present invention to provide a method for administrating data by organising the data according to spatial entities, such as topological or geographical entities, to which the data are associated, allowing the data to interact mutually between different data layers or between data layers and other data to generate derived data and represent these derived data to the user by means of a virtual representation of the spatial entity generated by a computer.

It is a further object to allow the data to interact so as to reduce the amount of data to be presented to the user, by means of excluding data or by means of combining more data into one new informational item.

In particular, it is an object of the present invention to provide a method according to which the virtual representation is of the earth and/or a subpart thereof, such as a country, a city, a house etc.

It is a further object of the present invention to provide a method according to which the virtual representation is hierarchically organised in a number of levels having different degree of details, and the data may be associated with one or more of the levels.

These as well as other objects of the present invention will become apparent from the following description.

DESCRIPTION OF THE INVENTION

The present invention offers a number of advantages with respect to administration and presentation of data which will be discussed in the following.

The present invention relates to a method for administering information at least some of which are related to a spatial entity, comprising providing, in a computer system, a data system residing on data storage means of the computer system and representing the spatial entity;

at least some of the data of the data system (co-ordinate data) representing respective sets of spatial co-ordinates of a co-ordinate system spanning the spatial entity, at least some of the data of the data system (spatial entity basic descriptor data) being associated with co-ordinate data and describing basic properties of the spatial entity at the respective co-ordinates, or the co-ordinate data being predefined as co-ordinate data pertaining to a particular known spatial entity, at least some of the data of the data system (layer data) being associated with co-ordinate data and describing phenomena related to the spatial entity at the respective co-ordinates, the layer data being organised in at least two groups (layers), each group (layer) containing one or several layer data, the method comprising the step of outputting, to an output device, layer data and representing the layer data at the output device in such a manner that one or more phenomena described by the layer data can be perceived as related to the particular position of the spatial entity which is defined by the co-ordinate data with which the particular layer data is/are associated, the data system comprising property data permitting the definition of how the data of a particular layer, or certain data of a particular layer, is/are to be perceived in relation to the basic descriptor data and/or in relation to data of one more other layers, and the output representing the spatial entity in accordance with these data.

The data storage means of the computer system are computer-readable media such as e.g. magnetic discs or tapes, optical discs, CD-ROMS, RAM circuits, etc., each media being in permanent or temporarily data-communication contact with the computer system.

The co-ordinate data define the spatial entity and are used to interpret the relation between the layer data and the spatial entity so as to enable a possible representation of the layer data together with at least some of the spatial entity basic descriptor data so that the representation can be perceived as related to the given position of the spatial entity. The spatial entity basic descriptor data describe properties of the spatial entity, typically a map in two or preferably in three dimensions, which for at least some selected areas comprises a vast number of details down to the interior of rooms in a house, TV-sets, electronic appliances, etc. For a simple use of the method, the spatial entity basic descriptor data may comprise sufficient information to relate a given position, such as one provided from a mobile output device, e.g. a cellular telephone equipped with a positioning detecting system, to a position within the spatial entity, so that layer data relating to the given position may be outputted to the output device, e.g. to be presented as an audio output. The phenomena described by the layer data are to be understood broadly as any kind of simple or complex information linked to a specific position or a specific area within the spatial entity. A phenomenon may be a restaurant or a hotel to which a number of information optionally are associated, such as prices, telephone and telefax number etc., and may alternatively or additionally comprise a link in the form of an data communication address to an external server on which additional information is stored, so that information being external to the computer system may be obtained via the system. A phenomenon may also be an event, such as a traffic situation report or a forecast, news being actual or of a historical character, commercials, ongoing events, such as the movement of a mail item through a distribution system, etc. Yet another type of phenomena is statistical data which typically are related to an area, the data being of crime rates, whether statistics, exchange rates, clouds, costs of telephone service. These examples of phenomena are meant to illustrate the concept of the term "phenomena" and not to limit the interpretation of the term.

The output device may comprise means for representing the layer data by means of visual indication and/or sound indication and/or sensory indication and/or olfactory indication and/or indication which can be transformed to one or more of these indications. However, in the most common and preferred embodiment of the invention, the output device comprises at least a visual output device and the representation of the layer data comprises a visual representation.

The spatial entity may be a virtual entity such as an imaginative entity but preferably and for the use of representing phenomena related to the physical world, the spatial entity is a universe, globe, country, landscape, house, room or other physical spatial entity.

The output device may be associated with a computer being remote to the computer system comprising the data storage means on which the data system resides and the layer data are outputted to the output device via a public data communication network. The output device may be a mobile device being in wireless contact with the computer system.

The spatial entity basic descriptor data are preferably map data defining a virtual representation of geographical or topographical characteristics of the spatial entity so that the phenomena straightforwardly may be perceived as being related to the spatial entity.

According to a particular embodiment of the invention, the property data of at least one of the layers comprise time span data defining dates pertaining to at least some of the phenomena described by the layer data. The particulars of the time span data are discussed below.

The layers defined in the data system may in an important embodiment comprise at least two types of layers, one type (input layer) comprising input data, and another type (derived layer) comprising at least some data which are the result of interaction between data of at least two layers of the data system or which are the result of the processing of data of a layer and other data of the data system. In particular, the layer data being outputted to the output device may preferably be a derived layer of the data system.

The inclusion in the output layer data of a phenomenon described by the layer data of one layer of the data system may be triggered by a phenomenon described by the layer data of another layer of the data system. Examples of this feature are given below.

The present, method may comprise an input layer generation procedure having the steps of retrieving from an external server via a public data communication network data being associated with the spatial entity, generating a layer of input data from the retrieved data, and entering said layer of input data into the data system of the computer system.

This input layer generation procedure may further comprises the steps of retrieving from an external server via a public data communication network property data being associated with the retrieved data, generating property data pertaining to said layer of input data, and entering said property data into the data system of the computer system.

The generation of a derived layer resulting from interaction between data of at least two layers may comprise, for each particular position of the spatial entity to which layer data of a least on of the layers relate, the steps of correlating property data pertaining to said layer data, generating a layer data of the derived layer from said layer data relating to the particular position of the spatial entity and said correlation, and entering the generated layer data into the data system as pertaining to the derived layer and being related to the particular position of the spatial entity.

In particular, the correlation of property data and the generation of layer data may be performed according to rules defined for the combination of layers of which the interaction is performed, said rules deviating from rules applied to deviating combination of layers and said rules being applied to each particular position of said spatial entity, and the generation of a derived layer may additionally comprise the steps of correlating property data pertaining to said layer data, generating property data of the derived layer from said correlation, and entering the property data into the data system as pertaining to the derived layer.

Said correlation of property data and the generation of property data are preferably performed according to rules defined for the combination of layers of which the interaction is performed, said rules deviating from rules applied to deviating combination of layers and said rules being applied to each particular position of said spatial entity.

According to one type of generation, the generated layer data is selected from layer data of one of the layers in question. In particular, the property data of at least one of the layers in question may comprise penetration level data pertaining to the phenomena described by the layer data of said layer and at the property data of least one of the other layers in question comprise resistance level data pertaining to the phenomena described by the layer data of said other layer, the correlation of property data comprises the step of comparing the penetration level of one or more possible phenomena associated with the particular position of the spatial entity with the resistance level of one or more possible phenomena of the at least one other layer and associated with the particular position of the spatial entity.

According to another type of generation, the generate layer data is calculated from numerical representation of layer data of one or more of the layers in question.

It is preferred that the layer data of at least some the layers are up-to-date, for which reason the data of at least one of the input layers may be updated regularly by means of the input layer generation procedure and derived layers related to said input layer(s) are re-generated accordingly.

The external server providing data, which may be of the form of "data collections" as described later, may be a network server which is communicating with on one hand the client and on the other hand with one or more suppliers of layer data or precursors for layer data. An individual supplier may supply all the data necessary for establishing and maintaining the layer data of one or more layers, or an individual supplier may supply part of the data necessary for establishing and maintaining the layer data as well as the property data of one or more layers, another part of the data being supplied by the server and/or by another supplier.

In order to improve the users perception of the integration of geographical entities and information or data, the representation of the geographic or topographic entity may be three-dimensional rendering, preferably dynamic (moving) three-dimensional rendering so that the representation may create the impression of an entity that can be moved around and turned. In this way, the user may see any part of the geographical entity as the central part, which feature is particularly useful when the geographical entity is a globe, the earth. The dynamic character of the three-dimensional rendering of the representation of the geographic entity is preferably maintained substantially throughout a session.

The individual layers may be zoomable so that they when zoomed reveal greater detail of the layer. Alternatively or additionally may one or more layers comprise a number of sub-layers which can be activated locally, territorially or globally within the topological or geographical representation to present ore details of or different aspects of the phenomena.

Likewise, the representation of at least some of the geographic or topographic entities locally, territorially or globally may comprise a number of sub-layers organised in a hierarchy and the sub-layers may be opened by user-activation of a domain, such as mouse-clicking at the representation of a particular geographic or topographic location, so as to present a new representation of the geographic location on a level of greater details or, expressed in another manner on a lower hierarchical level, and activation of a domain of the representation of lower hierarchical level opens a representation on a still lower hierarchical level to the extent that such a representation is provided for.

The two types of levels/layers may in a preferred embodiment of the invention be combined, so that representations of phenomena or events are associated with each of the hierarchical geographic or topographic levels.

One hierarchical level of geographic entity may be a globe or a globe-like three-dimensional entity, such as the earth, or the sky as seen from the earth, and the dynamic three-dimensional rendering comprises turn ng of the globe. Indeed, the highest hierarchical level of geographic entity may very well be a globe or several globes.

A sequence of hierarchically increasingly lower level s may comprise one or more of the following parts: globe→nation, state or city→street→building→room or parts of the sequence or shortcuts within the sequence or equivalent stepwise approaching a particular locality where a phenomenon is represented. This phenomenon may be a representation of a commercial product or a commercial service that may be represented in connection with advertising the product or the service.

The commercial product may be represented in three-dimensional rendering which optionally is dynamic and/or animated. The representation of the commercial product may advantageously interact with the information comprised within other layers so that the advertising of the product is limited to a very precisely defined group of customers or users in a precisely defined set of situations. In this manner, over-feeding of customers with non-relevant advertising thus creating the opposite effect, may be prevented.

Furthermore, the commercial product may be represented in dynamic three-dimensional rendering, wherein the representation allows operations, by actuating a domain or domains of the representation, selected from opening openable parts of the product, moving movable parts of the product, an dismantling dismantable parts of the product.

The commercial product is a product having actuating means actuating particular functions of the product, and the representation of the commercial product permits actuation, such as by activation of a particular domain of the representation, of one or more and optionally all of the actuation means, the representation responding to the actuation by representing the particular function actuated. The commercial product may be an electronic device such as a computer, a cellular telephone, a television set, etc., and the actuation results in execution of the function in the representation. Preferably, at least part of the actual programming of the functions of the actual commercial product has been translated into a computer-readable code, such as a code in a machine-independent language such as Java or a Java-like language, which code is executable on one or more network resources such as the client, to result in representation of the same functionality on the output device of the client.

When the above-mentioned actuation results in a function that can be executed through the network, the function is, in the representation, actually executed through the network, such as, e.g., the dialling of a telephone number on a telephone represented in the representation will result in the number actually being called via the network.

The data forming the indication values constituting the representation of the geographic or topographic entity or at least some of these values may be supplied to the system or communication network by an official entity having authority with respect to the particular type of data, the official authority may in particular be the provider of the particular layer or sublayer of geographic or topographic indication values or be the provider of the indication values of the full geographic entity.

The authority may be one appointed by the providers of the information or be the proprietors of the present system and method or representatives of these, or it may preferably be a state authority or a municipal authority. The authority may, when the geographic entity comprises more than one state, be a federal or multilateral authority, such as The United States of America, The European Commission, United Nations, etc.

The representation of a commercial product or service within the system and method of the present invention may be associated with representation of the price of the product or service and representation of dealers within one or more geographic territories. The price can be based on a neutral basic price provided, e.g., by the provider of the representation of the product, and is recalculated taking into consideration local taxes and other local costs based on information on local taxes and costs supplied by suppliers different from the provider of the representation of the product.

In one embodiment, a layer or a combination of layers to be included in generating the output to the output device is selected by the user of the client from a menu of layers or of stored profiles representing combinations of layers. Types of phenomena, data or events to be represented may also be selected by the user of the client from a menu of types of phenomena, data or events or of stored profiles representing combinations of types of phenomena, data or events. Furthermore, the combinations of layers and types of phenomena and/or data and/or events may possibly be selected by the user of the client from a menu of stored profiles representing such combinations.

The present invention further relates to a computer system comprising at least one general purpose computer having one or more compute programs stored within data storage means associated therewith, the computer system being arranged for as well as being adapted for performing the method according to the invention as disclosed above.

Furthermore, the present invention relates to a compute program product being adapted to enable a computer system comprising at least one general purpose computer having data storage means associated therewith and being arranged suitably to perform the method according to the invention as disclosed above.

EXAMPLE

Some important features of an embodiment of the present invention is disclosed in the example given below so as to illustrate some of the opportunities and advantages of a computer system operated according to the present invention as a supplement to the above description.

The user of the computer system interacts with an output device, typically a visual output device and one or more input devices, typically a keyboard an a pointing and activating device, such as a "mouse" or a touch-screen, an audio-input device such as a microphone, etc. These devices may be connected directly to the computer system or the computer system may be external to the user with a connection via a public and/or a private data communication network to the user, so that the user is a so-called "thin client" of the computer system, the connection being temporary or permanent and the network may include a local network, a wide area network, a public network or any combination thereof. The connection between the computer system and the devices by means of which the user interacts with the computer system is nonessential for the present invention.

The computer system comprises, apart from means for communicating via the network, a logical unit, such as e.g. a central processing unit, for controlling the function of the output device and the connection to the network and possibly data storage means such as e.g. magnetic discs, optical discs, electronic storage means such as Random Access Memory, EPROM, etc. and further logical units for controlling various parts of the system.

The computer system may retrieve data from two types of data providers, a primary type from which the data are retrieved in a format that can be directly entered into the data system as layer data and property data related thereto and a secondary type from which data associated with phenomena having spatial data related thereto may be retrieved. The data retrieved from the second type of providers are used to generate layer data to which property data are related by means of a dedicated software application residing on the computer system or being accessible by the computer system.

Layer data and the property data related thereto that have been generated in the above described manner or have been derived at the computer system from other layer data within the data system may be distributed from the computer system to external, similar computer systems so that the computer system may act as a data provider of the primary type.

A procedure for searching for data from data providers, retrieving data and generating layer data is illustrated in FIG. 1. The first step of the procedure is to select an area for the search defining a spatial entity to which the search results should be related. Optionally, the selected area is not only a spatial area but also a temporal so that a time span or time window is defined to which the search results should be related as well. The second step is to select and enter search text, preferably including keywords from a list of standard keywords used by one or more of the data providers, and optionally to define limits for the search, such as limits related to the property data of the layer data to be retrieved or data defining the properties of the phenomena searched for which data may be used to generate property data. Limits for property data being the span data may optionally be selected at this step instead of being selected at the first step. The third step is the actual search performed via a public data communication network on one or usually more servers belonging to data providers and the following retrieval of search results to the computer system. The search results are sorted in the fourth step in which results are selected by means of interaction, such as filtering, between the layer data that are generated from the retrieved search result and other layers of the data system. This selection is added to possible collected information from one or more previous searches. The collection of information may turn out to be empty or sparse compared to a predefined level which results in a return to the second step of the procedure. Alternatively, an output layer is generated from the collected information and is outputted to the output device at a fifth step of the procedure. The user may at this point decide to return to the second step in order to improve or enhance the collection of information, or the user may select one or more of the opportunities: Save the search results by entering the generated layers into the data system, Distribute the generated layers to a limited group of other users or make the generated layers available to said group, and Publish the generated layer and make the layers available to search from a larger or undefined group of users, thus being a provider of layers and layer data.

Organisation of Layer Data

The layer data to be represented according to the method of the invention are advantageously organised in the data system in a standardised form. A particular suitable form for organising data is in the following described as a "data collection" and should be regarded as a particular and preferred embodiment of the present invention but not as a feature limiting the possible applications of the present invention.

An essential feature for a data collection of a form that may communicate with the computer system according to the present invention is that data relating to the particular spatial entity to which each of the layer data in the data collection is associated, is comprised within the data collection or in another way uniquely associated with the data collection. The spatial entity data may be of the form of longitude and latitude data defining one or more points on or one or more sub-areas or sub-spaces of the full spatial entity represented by the system or the spatial entity data may simply comprise a unique identification code referring to a standard table of spatial entities comprised within the system.

The standard table may again be organised hierarchical as an n-dimensional-array and comprise unique identification codes of sub-areas or sub-spaces within a spatial entity. An example of the latter is that the number 43 of the standard table may refer to the United States of America, the number 17 within this area refers to the state of Oklahoma and the number 2 within this sub-area refers the city of Tulsa. A specific geographical entity may be comprised within more than one standard table; the city of Tulsa may e.g. also be identified in a list of American cities etc.

The hierarchical structure of the standard table may be used within the data collections so that a data-collection comprising demographic data of the USA has the number 43 comprised within an identification string of the data collection, thereby defining the geographical entity of the data collection as the USA and the data relating to Tulsa or a pointer to such data in another data base are stored in the 2nd row of the 17th column of a data array within the data collection.

The spatial entity data of the data collections may in a preferred embodiment of the invention be represented either by longitude/latitude (and optionally altitude) data or by a unique identification code, so that only a subpart of the full spatial entity represented by the system is having unique identification codes associated with it but so that every location may be referred to by a data collection.

A data collection comprises in a preferred embodiment of the invention an identification string and a data storage part, the term data here being understood in a broad sense which will be referred to later. The identification string comprises as mentioned previously the spatial entity data, such as geographical entity data, and preferably also a text string identifying the data stored in the data storage part. The identification string may also comprise a number of keywords/key terms or representation of keywords/key terms, preferably chosen from a standard table, so that efficient search by users of the system among the various data collections is facilitated.

Examples of elements that may be comprised in an identification string are: "Type" specifying the type of data stored in the storage part of the data collection, "Xtension" specifying the spatial entity and "Date" specifying the time of the last update of the data in the data collection.

Each data collection is advantageously associated with an identification number being unique within the global system, the identification number also being comprised in the identification string. A standard, global table identifies each identification number with the location (on which server) of the data collection. Thus, a search among available data collections is a search in a set of identification strings, the strings comprising adequate information for a search. The selected data collection may subsequently be downloaded by using the unique identification number to look up the location of the server on with the data collection is stored and download the data collection.

The data stored within the data collections may range from the most simple data, like a list of the locations of gas stations belonging to a specific gas company, lexical data regarding climate, population, history, events, maps, etc. to more complex data like flight schedule for airports being constantly updated for delays and cancellations and weather reports and forecasts including time and date.

The data may also be of a type that allows for interactive communication with other subsystems, such as for commercial use, e.g. for ordering of flight tickets, for interchange of data between the user and the subsystem, etc.

The data may also be of a highly complex type allowing for interactive communication with objects being external to the subsystem to which the user is connected, the objects being either physical or virtual objects. With physical objects may be objects comprising a control unit being temporarily or permanently connected to a larger network connecting to the system, which control units are designed for interactive communication and possibly remote control via the network connection. The type of objects may range from automatic coffee makers and cellular telephones, to cars, buildings, etc.

Property Data

The property data stored within the data system may relate to the layer data either as generally applicable to all layer data within a given layer or specifically to one or more layer data within the layer. The data system is provided or comprising a plurality of property data of both types but most of the property data are optional for the layers and a given layer comprises normally only some of the property data provided for.

One type of property data being generally applicable are the compulsory layer type data indicating the type of layer data within the layer as well as the type/interpretation of other property data associated with the layer data, generally applicable property data as well as specific property data. The layer type data applies to all layer data within a given layer so that all layer data has the specified property data, being generally or specifically applicable, although a given property data for a given layer data may be void. The layer type data identified to the computer system how the layer data are to be perceived in relation to the basic descriptor data, in case they are of type to be perceived, as well as the rules according to which the layer data interact with layer data of other layers of specified types so that all layer data within a given layer interact according to the same given rules.

Some layer data, e.g. filter data for being used in the derivation of layer data from other layer data, do not have property data defining how they are to be perceived for the reason that they are not meant to be presented at the output device. A filter layer is one of the simplest types of layers within the definition of layers of the present description. The filter layer comprises only property data, which in this case constitute the layer data. The property data define for one type of filter layers the resistance of the layer (resistance level data) to penetration of phenomena defined by layer data of other layers and having penetration level data pertaining thereto. The filter layer is used for filtering layer data so that only data of a given importance are included in the derived layer produced by the interaction between the said other layers and the filter layer. The property data of a more advanced type of filter layer further comprise weighting data being used in the correlation with the property data and optionally the layer data of the other layer to produce a result being decisive of which phenomena are included in the derived layer. These property data may be constant for the whole spatial entity represented by the layer or may vary over the spatial entity. The filter layers may provide filtering base on all types of property data of other layers and optionally also on the layer data themselves.

Other types of property data may be applied generally or specifically, such as optional appearance data specifying how to present the layer data within the layer, e.g. as a colour, an icon, a three dimensional object an animation etc. Another type of these optional property data are modification data defining an influence on or modification of layer data of other layers with which the layer in question interacts, the influence being according to the type of data of this other layer an optionally also according to the content of layer data of the layer in question and/or of layer data of third layers included in the interaction.

Yet another type of property data are time span data. The data collections are designed for comprising optionally temporal data as well as the spatially related data, the temporal and spatially related data being mutually related, so as to enable the representation of e.g. movements of transport vehicles, tracking of postal items through a delivery system, representation of movements of military troops and units during a war as a part of a history data collection, migration time and routes of various species of birds, etc. The time span data may also be a simple definition of a beginning date of a phenomena, optionally including the time of day, an end date of both and thus be a suitable type of property data for being used by a filter layer for filtering the phenomena of a layer.

Interaction of Layers

The layer data and property data of the layers of the data system interact with corresponding data of other layers of the data system to generate derived layers, in particular an output layer for being outputted to the output device. The layer data of the output layer describe the phenomena to be presented on the output device combined with the spatial entity basic description data providing a virtual representation of the geographical entity on the visual output device, in a manner so that the phenomena can be perceived as related to the particular positions of the spatial entity which is defined by the co-ordinate data with which the phenomena are associated. One purpose of the interaction and generation of derived layers is to delimit the amount of information reaching the user to a perceivable level of relevant information and to prevent unwanted or irrelevant information from reaching the user. Another purpose is to create new information on request by combining input data retrieved by the computer system as result of an information search on external servers. The new information may be presented to the user on the output device, to perform talks for the user, the tasks being specified by the user, by the layer data or by a combination thereof, or to further interact with other layers of the data system.

The interaction between ordinary layers and filter layers is described above. One example of the use of a filter layer is for the purpose of preventing layer data of a layer to reach the output layer except in case a phenomenon is of sufficient importance, defined by its penetration level, in which case the phenomenon pushes its way through the filter layer to the output layer. The change in penetration level may be achieved from an update of the layer data by retrieving updated data from the external servers and re-generation of the layer data as well as the property data of the layer, or it may be achieved by time span data defining a change in penetration level based on the actual time and date. A traffic information data layer is typically such a dormant layer that is not represented in the output layer except in case of traffic jam or the like in a part of the spatial entity defined by the user as being of particular interest Different types of information comprised within layers of the data system may be combined by interaction of the layer data of the layers to produce a result of interest for the user, such as an interaction between a layer representing crime statistics of areas of a city, a layer representing hotels within the city including information relating to standards, vacant rooms etc. and a layer representing weather statistic of the area for a given time period of the year, the result of the interaction being useful in selecting and making reservations for a hotel room. Instead of the layer representing hotels, a real estate information layer may be included for obtaining an output for selecting and purchasing real estate.

Yet another example of interaction of layers is a stock marked information layer interacting with a filter layer for the magnitude of changes of stock prices and a filter layer for a branch of companies, such as software companies, in which a penetration of stock marked information result in search for relevant financial news related to a given geographical area, such as northern Europe and the generation of one or more news layers, which interact with other filter layers etc. so that the search for and selection of information relevant to the user is triggered by events or phenomena retrieved from external servers and being used to generate layer data or a layer.

A vast number of interactions exist currently and an infinite number of other interactions can be realised according to the invention. The individual interaction is not in itself of particular interest for the invention as such, the invention relates to the method of operating the computer system as well as the computer system having the elements for enabling it to perform the method of the invention, which method makes these interactions achievable in an organised and efficient manner.

Like the individual interaction is of less interest with respect to the invention as such, so is the actual implementation of the invention in form of program listing etc. The individual applications and elements that constitute the computer programs for adapting a general purpose computer to perform the method according to the invention are for most parts well-known and can be obtain from a number of vendors of computer software. It is the combination of the functions of the applications and elements that enables the present method to be performed and to achieve this combination is an obvious task for the person skilled in the art for which reason the details will not be discussed in the present description.

What is claimed is:

1. A method for administering information at least some of which are related to a spatial entity, comprising providing, in a computer system, a data system residing on data storage means of the computer system and representing the spatial entity, at least some of the data of the data system being co-ordinate data representing respective sets of spatial co-ordinates of a co-ordinate to system spanning the spatial entity, at least some of the data of the data system being spatial entity basic descriptor data which are associated with co-ordinate data and describing basic properties of the spatial entity at the respective co-ordinates, or the co-ordinate data being predefined as co-ordinate data pertaining to a particular known spatial entity, at least some of the data of the data system being layer data which are associated with co-ordinate data and describing phenomena related to the spatial entity at the respective co-ordinates, the layer data being organised in at least two layers, each layer containing one or several layer data the layers comprise at least two types of layers, one type being input layers comprising input data, and another type being derived layers comprising at least some data whit are the result of interaction between data of at least two layers of the data system or which are the result of the processing of data of a layer and other data of the data system, the generation of a derived layer resulting from interaction between data of at least two layers comprises, for each particular position of the spatial entity to which layer data of a least one of the layers relate, the steps of generating a layer data of the derived layer from said layer data relating to the particular position of the spatial entity, and entering the generated layer data into the data system as pertaining to the derived layer and being related to the particular position of the spatial entity, the method further comprising the step of outputting, to an output device, layer data of a derived layer and representing the layer data at the output device in such a manner that one or more phenomena described by the layer data can be perceived as related to the particular position of the spatial entity which is defined by the co-ordinate data with which the particular layer data is/are associated, the data system comprising property data permitting the definition of how the data of a particular layer, or certain data of a particular layer, is/are to be represented at the output device in relation to the basic descriptor data and/or in elation to data of one or more other layers, and the output representing the spatial entity in accordance with these data.

2. A method according to claim 1, wherein the output device comprises a visual output device and the representative of the layer data comprises a visual representation.

3. A method according to claim 1, wherein the output device comprises means for representing the layer data by means of visual indication and/or sound indication and/or sensory indication and/or olfactory indication and/or indication which can be transformed to one or more of these indications.

4. A method according to claim 1, wherein the spatial entity is a universe, globe, country, landscape, house, room or other physical spatial entity.

5. A method according to claim 1, wherein the output device associated with a computer being remote to the computer system comprising the data storage means on which the data system resides and the layer data are outputted to the output device via a public data communication network.

6. A method according to claim 1, wherein the spatial entity basic descriptor data are map data defining a virtual representation of geographical or topographical characteristics of the spatial entity.

7. A method according to claim 1, wherein the property data of at least one of the layers comprise time span data defining dates pertaining to at least some of the phenomena described by the layer data.

8. A method according to claim 1, wherein the inclusion in the output layer data of a phenomena described by the layer data of one layer of the data system is triggered by a phenomenon described by the layer data of another layer of the data system.

9. A method according to claim 1, comprising an input layer generation procedure having the steps of retrieving from an external server via a public data communication network data being associated with the spatial entity, generating a layer of input data from the retrieved data, and entering said layer of input data into the data system of the computer system.

10. A method according to claim 7, wherein the procedure further comprises the steps of retrieving from an external server via a public data communication network property data being associated with the retrieved data, generating property data pertaining to said layer of input data, and entering said property data into the data system of the computer system.

11. A method according to claim 1, wherein the generation of a derived layer resulting from interaction between data of at least two layers further comprises, for each particular position of the spatial entity to which layer data of at least one of the layers relate, the steps of correlating property data pertaining to said layer data, and generating a layer data of the derived layer from said layer data relating to the particular position of the spatial entity as well as said correlation.

12. A method according to claim 11, wherein the correlation of property data and the generation of layer data is performed according to rules defined for the combination of layers of which the interaction is performed, said rules deviating from rules applied to deviating combination of layers and said rules being applied to each particular position of said spatial entity.

13. A method according to claim 11, wherein the generation of a derived layer further comprises the steps of correlating property data pertaining to said layer data, generating property data of the derived layer from said correlation, and entering the property data into the data system as pertaining to the derived layer.

14. A method according to claim 13, wherein the correlation of property data and the generation of property data is performed according to rules defined for the combination of layers of which the interaction is performed, said rules deviating from rules applied to deviating combination of layers and said rules being applied to each particular position of said spatial entity.

15. A method according to claim 11, wherein the generated layer data according to one type of generation is selected from layer data of one of the layers in question.

16. A method according to claim 15, wherein the property data of at least one of the layers in-question comprise penetration level data pertaining to the phenomena described by the layer data of said layer and at the property data of least one of the other layers in question comprise resistance level data pertaining to the phenomena described by the layer data of said other layer, the correlation of property data comprises the step of comparing the penetration level of one or more possible phenomena associated with the particular position of the spatial entity with the resistance level of one or more possible phenomena of the at least one other layer and associated with the particular position of the spatial entity.

17. A method according to claim 11, wherein the generated layer data according to one type of generation is calculated from numerical representation of layer data of one or more of the layers in question.

18. A method according to claim 9, wherein the data of at least one of the input layers are updated regularly by means of the input layer generation procedure and derived layers related to said input layer(s) are re-generated accordingly.

19. A method according to claim 9, wherein the external server via a public communication network communicates data being associated with a spatial entity with the computer system and as well as with one or more suppliers of data or precursors for data.

20. A method according to claim 19, wherein an individual supplier supplies all the data necessary for establishing and maintaining the layer data as well as the property data of one or more layers.

21. A method according to claim 19, wherein an individual supplier supplies part of the data necessary for establishing and maintaining the layer data as well as the property data of one or more layers, another part of the data being supplied by the server and/or by another supplier.

22. A method according to claim 1, wherein the representation of the spatial entity is three-dimensional rendering.

23. A method according to claim 22, wherein the three-dimensional rendering is dynamic, moving, three-dimensional rendering.

24. A method according to claim 23, wherein the dynamic character of the three-dimensional rendering of the representation of the spatial entity is maintained substantially throughout a session.

25. A method according to claim 1, wherein individual layers are zoomable and are zoomed to reveal greater detail in the layer.

26. A method according to claim 1, wherein one or more layers comprise a number of sub-layers which can be activated locally, territorially or globally within the spatial entity representation to present more details of or different aspects of the phenomena.

27. A method according to claim 1, wherein the representation of at least some of the spatial entities locally, territorially or globally comprises a number of sub-layers organized in a hierarchy and the sub-layers may be opened by user-activation of a domain, such as activating the representation of a particular spatial entity by means of a pointing device, so as to present a new representation of the spatial entity on a level of greater details or, expressed in another manner on a lower hierarchical level, and activation of a domain of the presentation of lower hierarchical level opens a representation on a still lower hierarchical level to the extent that such a representation is provided for.

28. A method according to claim 27, wherein representations of phenomena are associated with each of the hierarchical spatial levels.

29. A method according to claim 1, wherein one hierarchical level of spatial entity is a globe, and the dynamic three-dimensional rendering comprises turning of the globe.

30. A method according to claim 29, wherein the highest hierarchical level of spatial entity is a globe or several globes.

31. A method according to claim 1, wherein a sequence of hierarchically increasingly lower levels comprises globe→nation, state or city→street→building→room or parts of the sequence or shortcuts within the sequence or equivalent stepwise approaching a particular locally where a phenomenon is represented.

32. A method according to claim 31, wherein the phenomenon is a representation of a commercial product or a commercial service.

33. A method according to claim 32, wherein the commercial product or service is represented in connection with advertising the product or the service.

34. A method according to claim 32, wherein the commercial product or service is represented in connection with advertising the product or the service.

35. A method according to claim 34, wherein the commercial product is represented in dynamic three-dimensional rendering, and the representation allows operations, by actuating a domain or domains of the representation, selected from opening openable parts of the product, moving movable parts of the product, and dismantling dismantable parts of the product.

36. A method according to claim 32, wherein the commercial product is a product having actuating means actuating particular functions of the product, and the representation of the commercial product permits actuation, such as by activation of a particular domain of the representation, of one or more and optionally all of the actuation means, the representation responding to the actuation by representing the particular function actuated.

37. A method according to claim 36, wherein the commercial product is an electronic device such as a computer, a cellular phone, a television set, etc., and the actuation results in execution of the function in the representation.

38. A method according to claim 37, wherein at least part of the actual programming of the functions of the actual commercial product has been translated into a computer readable code, such as a code in a machine-independent language such as Java or a Java-like language, which code is executable on one or more network resources such as the client, to result in representation of the same functionality on the output device of the client.

39. A method according to claim 38, wherein, when the actuation results in a function that can be executed through the network, the function is, in the representation, actually executed through the network, such as, e.g., the dialing of a telephone number on a telephone represented in the representation will result in the number actually being called via the network.

40. A method according to claim 1, wherein at least some of the spatial entity basic descriptor data are based on data obtained from an official entity having authority with respect to the particular type of data.

41. A method according to claim 40, wherein the official authority is the provider of the particular layer or sub-layer of spatial entity basic descriptor data.

42. A method according to claim 40, wherein the official authority is a state authority or a municipal authority.

43. A method according to claim 40, wherein the authority, when the spatial entity comprises more than one state, is a federal or multilateral authority, such as The United States of America, The European Commission and United Nations.

44. A method according to claim 1, wherein representation of a commercial product or service is associated with representation of the price of the product or service and representation of dealers within one or more geographic territories.

45. A method according to claim 44, wherein the price is based on a neutral basic price provided, e.g., by the provider of the representation of the product, and is recalculated taking into consideration local taxes and other local costs based on information on local taxes and costs supplied by suppliers different from the provider of the representation of the product.

46. A method according to claim 1, wherein the selection of a layer or a combination of layers to be included in generating the output to the output device is performed by a user from a menu of layers or of stored profiles representing combinations of layers, said menu being presented to the user by means of the output device.

47. A method according to claim 1, wherein types of phenomena to be represented at the output device are selected by the user from a menu of types of phenomena or of stored profiles representing combinations of types of phenomena, said menu being presented to the user by means of the output device.

48. A method according to claim 1, wherein combinations of layers and types of phenomena are selected by the user of the client from a menu of stored profiles representing such combinations, said menu being presented to the user by means of the output device.

49. A computer system comprising at least one general purpose computer having one or more computer programs stored within data storage means associated therewith, the computer system being arranged for, e.g. with appropriate data communication connections to appropriate external servers, as well as being adapted for performing the method of claim 1.

50. A computer program product being adapted to enable a computer system comprising at least one general purpose computer having data storage means associated therewith and being arranged suitably, e.g. with appropriate data communication connections to appropriate external servers, to perform the method of claim 1.

* * * * *